United States Patent Office 2,839,473
Patented June 17, 1958

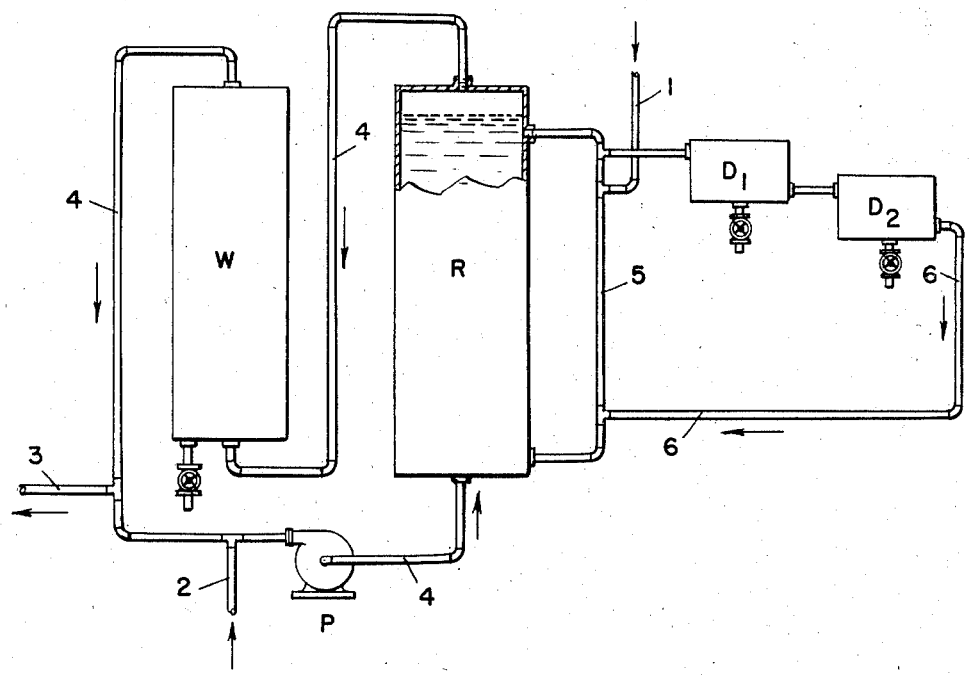

2,839,473

METHOD OF PURIFYING A CUPROUS SALT CATALYST IN THE SYNTHESIS OF ACRYLONITRILE

Daniel Porret, Monthey, Switzerland, assignor to Ciba Limited, Basel, Switzerland, a Swiss firm Application December 4, 1952, Serial No. 324,108

Claims priority, application Switzerland December 7, 1951

9 Claims. (Cl. 252—411)

It is known to manufacture acrylonitrile by reacting acetylene with hydrocyanic acid in the presence of an aqueous cuprous salt catalyst according to the equation

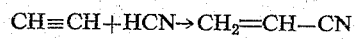

$$CH{\equiv}CH+HCN \rightarrow CH_2{=}CH-CN$$

The reaction is advantageously carried out at about 80–100° C.

Among the cuprous salt catalysts hitherto used for the above synthesis of acrylonitrile the so-called Nieuwland catalyst has been found to be especially suitable. In its most usual form this catalyst consists of a mixture of 45.5 parts by weight of cuprous chloride, 24.5 parts by weight of ammonium chloride, 2.4 parts by weight of concentrated hydrochloric acid and 42 parts by weight of water. The ammonium chloride may be replaced by an equivalent quantity of a mixture of potassium chloride and sodium chloride, and instead of the hydrochloric acid another strong acid, such as hydrobromic acid, sulfuric acid or phosphoric acid may be used.

Depending on the reaction conditions used the relative proportions of the components contained in the catalyst may vary within certain limits.

In the processes as carried out in practice the catalyst mixture is heated in a reaction tower at 70–100° C., and acetylene is passed through the hot mixture and hydrocyanic acid is simultaneously introduced dropwise. The acrylonitrile so formed is removed from the reaction tower by the current of acetylene, is dissolved out of the gas stream by absorption in water or by condensation, and is isolated by fractional distillation, the excess of acetylene being returned to the reaction tower. In this method of working the acetylene may be diluted by the addition of an inert gas, such as nitrogen.

The duration of the above continuous process is limited by the fact that the utility of the catalyst is impaired, inter alia, by the formation of resinous and gummy byproducts and the apparatus becomes clogged so that the synthesis must be discontinued after a little time in order to renew the whole of the catalyst.

At a raised temperature the fresh Nieuwland catalyst is a clear liquid having a yellowish coloration. During the synthesis of acrylonitrile the catalyst becomes redbrown and finally black, and oil droplets and solid byproducts separate out, which in time clog the apparatus and impair the utility of the catalyst. In practice the catalyst is generally renewed when the quantity of acrylonitrile formed in unit time has fallen to about one-half of the quantity formed with fresh catalyst. The copper can be separated from the used catalyst by the addition of zinc dust, and then worked up into fresh catalyst.

The by-products, which diminish the activity of the catalyst, are formed in part from impurities in the acetylene used, for example, from diacetylene, allylene, and in part from other unsaturated compounds such as vinyl-acetylene, divinyl-acetylene and cyanobutadiene formed in small quantity as by-products in the acrylonitrile synthesis and even from acrylonitrile.

It has been suggested, in order to prolong the active life of the cuprous acid catalyst, to remove the primary impurities which give rise to the formation of by-products. To this end the fresh acetylene is purified before use by washing with high boiling solvents, oils or sulfuric acid. However, it is almost impossible to eliminate the impurities completely in this manner. Moreover, the circulating acetylene, before it is returned to the reaction tower, is also subjected to a purification treatment in order to remove vinyl acetylene and divinylacetylene formed. For this purpose the gaseous mixture is cooled to a low temperature, for example, −70° C. or the gas is passed through active carbon. In this manner the formation of undesired polymerisation products cannot be completely prevented, so that the active life of the catalyst is prolonged for only a relatively short time.

The present invention is based on the observation that, long before greasy and resinous materials separate, there are present in solution in the hot catalyst polymerisation products which can be separated out by cooling the catalyst. Accordingly, this invention provides a method of purifying and prolonging the period of activity of a cuprous salt catalyst in the synthesis of acrylonitrile, in which the polymerization products dissolved in the hot catalyst are caused to separate by cooling at least a part of the catalyst having a temperature of 70–100° C. to a temperature below 70° C. and at which the catalyst is still substantially in the liquid form.

The catalyst is advantageously cooled only to such an extent that it is still liquid and only small amounts of salts crystallize out. When the usual Nieuwland catalyst is used cooling to a temperature of about 40° C. is advantageous. It is of advantage not to reheat the cooled catalyst immediately to the temperature required for the synthesis of acrylonitrile, that is to say, about 70–100° C., but to reheat it in stages. This procedure enables the separated polymerization products to coagulate properly. Advantageously the catalyst is first brought to a temperature of 50–55° C., whereby cuprous chloride which has crystallized out is redissolved and the polymerisation products which have separated out unite into a compact, coherent mass, which can be removed mechanically.

The method of the invention may be carried out by subjecting the whole of the catalyst in a reaction tower to the aforesaid purification treatment. This procedure has the great advantage that after purification the catalyst is practically completely free from polymerisation products. However, it has the disadvantage that the synthesis must be interrupted. As it is preferable to carry out the manufacture of acrylonitrile in a continuous manner and as interruptions should be avoided as far as possible, it is of advantage to subject only a part of the catalyst to the purification treatment. For this purpose there is removed from time to time a quantity of the catalyst insufficient to disturb the synthesis, for example, one-tenth of the total quantity of catalyst, to cool this portion of the catalyst in a vessel to about 40° C. whereby the polymerisation products are precipitated, subsequently to reheat the catalyst to about 50–55° C., and to separate the purified liquid catalyst from the products sticking to the walls and floor of the vessel and return it to the reaction tower. It may be of advantage, instead of using a single vessel, to use two vessels, the first being maintained at about 40° C. and the second at 50–55° C. Advantageously the two vessels are connected with one another in series and connected to the rest of the synthesis apparatus so that the purification can be carried out continuously. An arrangement of this kind is shown diagrammatically by way of example in the accompanying drawing, which is described below in Example 1. This method of operation enables the catalyst to be purified without interrupting the synthesis of acrylonitrile.

The frequency with which it is necessary to carry out the purification operation, whether the total quantity of the catalyst or only a part thereof is subjected to purification, depend on the speed of formation of the polymerization products, which is influenced by the purity of the starting materials and other conditions of the synthesis. It has been found that the hot catalyst can hold in solution about 1 percent of polymerization products. Only after exceeding the limit of saturation do insoluble oil droplets and greasy material form in the catalyst. When a fresh catalyst is used it takes about 3–5 days to reach the limit of saturation. When about one-tenth of the total quantity of catalyst is subjected to a single purification treatment, it suffices in most cases to carry out the purification treatment two to three times per day, in order to keep the content of polymerisation products in the catalyst below the saturation point.

The following examples illustrate the invention:

*Example 1*

The apparatus used for the synthesis is shown diagrammatically in the accompanying drawing. The apparatus comprises a reaction tower R, in the branch pipe 5 of which is connected a pipe system 6 containing a purification vessel $D_1$ and, if desired, a further vessel $D_2$, and also a washing tower W in which the acrylonitrile is washed. The two towers are connected by means of a conduit 4, destined for the gas circulation which is maintained by a pump P. The hydrocyanic acid is supplied in anhydrous liquid form or in the form of an aqueous solution through the conduit 1. The system is supplied with fresh acetylene through the conduit 2, and a part of the circulating gas is removed as waste gas through the conduit 3.

For starting the synthesis 60 liters of Nieuwland catalyst are charged into an apparatus of appropriate capacity. The catalyst consists of 35.2 percent of water, 40.8 percent of cuprous chloride, 22.0 percent of ammonium chloride, 0.6 percent of copper powder and 1.4 percent of concentrated hydrochloric acid. The catalyst is heated to about 80° C. and nitrogen is caused to flow into the system through the conduit 2, the nitrogen causing the catalyst to circulate through the tower R and the lateral branch pipe 5. The catalyst is first charged with hydrocyanic acid which enters through the conduit 1. As soon as the nitrogen leaving the reaction tower contains, per 100 liters, about 0.5 gram of hydrocyanic acid, the nitrogen is replaced by acetylene, whereupon the formation of acrylonitrile sets in immediately. The acetylene is caused to circulate at the rate of 6000 liters per hour.

At the outset the pipe system 6, which in the present example contains only one purification vessel $D_1$, is not connected. The acrylonitrile formed in the reaction tower is carried away with the stream of acetylene and is dissolved out of the gas stream in the washing tower W with water. Fresh acetylene is supplied through the conduit 2, and about 15–20 percent of the quantity of fresh acetylene introduced is removed from the cycle as waste gas through the conduit 3. After carrying on the synthesis for 5 days the catalyst becomes saturated with polymers. It contains about 1 percent of crude polymers, which contain cuprous chloride. 6 liters of catalyst are then led into the purification vessel $D_1$, where the catalyst is cooled to 40° C., the initially clear catalyst becoming turbid and the polymers separating out together with a small amount of cuprous chloride. After being cooled to 40° C., the catalyst is reheated to 50–55° C. while stirring, whereupon the cuprous chloride that has crystallized out is redissolved and the polymers deposit on the floor and walls of the vessel. The purified catalyst is returned to the main quantity of the catalyst through the pipe system 6, and the precipitated polymerization products, which weigh about 100 grams, may be removed from the vessel mechanically.

By repeating the above described purification treatment three times, the content of polymers in the catalyst mass in the reaction tower falls from 1 percent to 0.75 percent.

By carrying out the purification treatment twice a day precipitation of the polymerization products in the synthesis apparatus is prevented.

*Example 2*

The synthesis of acrylonitrile is carried out as described in Example 1, except that an apparatus having two purification vessels $D_1$ and $D_2$ are used, the first being maintained at 40° C. and the second at 50–55° C. In the first container the hot catalyst is cooled and the polymerization products precipitated, and in the second vessel the polymers coagulate, so that the main quantity of the precipitated products is removed from the second vessel. During the whole period of the synthesis a portion of the catalyst is passed continuously through the purification containers so that the purification is continuous.

*Example 3*

The synthesis of acrylonitrile is carried out as described in Example 1, except that an apparatus is used which contains neither the pipe system 6 nor the vessels $D_1$ and $D_2$.

The synthesis is started and continued until the content of polymers in the catalyst is about 1 percent. At this point the synthesis is discontinued. The whole of the catalyst is run into a large vessel and cooled to 40° C. while stirring, whereupon the polymers separate out. The mixture is then reheated to 50–55° C., the purified catalyst is decanted from insoluble products, and is returned to the reaction tower. The whole of the catalyst contains at most only traces of dissolved polymerization products. Only a short time is required for the purification treatment. When about 60 liters of catalyst are used the purification treatment is finished within one hour.

What I claim is:

1. A method of purifying and prolonging the period of activity of a cuprous salt catalyst in the synthesis of acrylonitrile from hydrocyanic acid and acetylene in a synthesis zone, which comprises removing at least part of the reaction mixture from the synthesis zone, at a temperature of 70–100° C. and before any separation has taken place in such reaction mixture, and cooling the thus-removed part to a temperature below 70° C. and at which the cuprous salt catalyst is still in substantially liquid form, whereby polymerization products come out of solution in the catalyst and are precipitated therefrom with concomitant purification of said catalyst.

2. A method of purifying and prolonging the period of activity of a cuprous salt catalyst in the continuous synthesis of acrylonitrile from hydrocyanic acid and acetylene in a synthesis zone, which comprises removing at least part of the reaction mixture from the synthesis zone, at a temperature of 70–100° C. and before any separation has taken place in such reaction mixture, and cooling the thus-removed part to about 40° C., whereby polymerization products come out of solution in the catalyst and are precipitated therefrom with concomitant purification of said catalyst, and returning the catalyst free from said polymerization products to the synthesis zone.

3. A method of purifying and prolonging the period of activity of a cuprous salt catalyst in the continuous synthesis of acrylonitrile from hydrocyanic acid and acetylene in a synthesis zone, which comprises removing at least part of the reaction mixture from the synthesis zone, at a temperature of 70–100° C. and before any separation has taken place in such reaction mixture, and cooling the thus-removed part to about 40° C., whereby polymerization products come out of solution in the catalyst, reheating the cooled reaction mixture in stages to the temperature required for the synthesis of acrylonitrile in order to enhance coagulation of precipitated polymerization products, and returning purified and reheated catalyst to the synthesis zone.

4. A method of purifying and prolonging the period of activity of a cuprous salt catalyst in the continuous synthesis of acrylonitrile from hydrocyanic acid and acetylene in a synthesis zone, which comprises removing at least part of the reaction mixture from the synthesis zone, at a temperature of 70–100° C. and before any separation has taken place in such reaction mixture, and cooling the thus-removed part to about 40° C., whereby polymerization products come out of solution in the catalyst, reheating the cooled reaction mixture in a first stage to 50–55° C. and in a second stage to 70–100° C. in order to enhance coagulation of precipitated polymerization products, and returning purified and reheated catalyst to the synthesis zone.

5. A continuous method of purifying and prolonging the period of activity of a cuprous salt catalyst in the continuous synthesis of acrylonitrile from hydrocyanic acid and acetylene in a synthesis zone, which comprises removing only about one-tenth of the total quantity of the reaction mixture from the synthesis zone, at a temperature of 70–100° C. and before any separation has taken place in such reaction mixture, and cooling the thus-removed part to about 40° C., whereby polymerization products come out of solution in the catalyst, reheating the cooled reaction mixture in a first stage to 50–55° C. and in a second stage to 70–100° C. in order to enhance coagulation of precipitated polymerization products, and returning purified and reheated catalyst to the synthesis zone.

6. A continuous method of purifying and prolonging the period of activity of a cuprous salt catalyst in the continuous synthesis of acrylonitrile from hydrocyanic acid and acetylene in a synthesis zone, which comprises removing only about one-tenth of the total quantity of the reaction mixture from the synthesis zone, at a temperature of 70–100° C. and before any separation has taken place in such reaction mixture, and cooling the thus-removed part to about 40° C., whereby polymerization products come out of solution in the catalyst, reheating the cooled reaction mixture in a first stage to 50–55° C. and in a second stage to 70–100° C. in order to enhance coagulation of precipitated polymerization products, the said cooling and reheating being carried out in a single purification zone and the purified and reheated catalyst being returned to the synthesis zone.

7. A continuous method of purifying and prolonging the period of activity of a cuprous salt catalyst in the continuous synthesis of acrylonitrile from hydrocyanic acid and acetylene in a synthesis zone, which comprises removing only about one-tenth of the total quantity of the reaction mixture from the synthesis zone, at a temperature of 70–100° C. and before any separation has taken place in such reaction mixture, and cooling the thus-removed part to about 40° C., whereby polymerization products come out of solution in the catalyst, reheating the cooled reaction mixture in a first stage to 50–55° C. and in a second stage to 70–100° C. in order to enhance coagulation of precipitated polymerization products, the said cooling and reheating being carried out in successive zones of which the first is maintained at about 40° C. and the second at 50–55° C., and the purified and reheated catalyst being continuously returned from the latter to the synthesis zone.

8. A method of purifying and prolonging the period of activity of a cuprous salt catalyst in the synthesis of acrylonitrile from hydrocyanic acid and acetylene in a synthesis zone, which comprises removing only about one-tenth of the total quantity of the reaction mixture from the synthesis zone, at a temperature of 70–100° C. and before any separation has taken place in such reaction mixture, and cooling the thus-removed part to about 40° C., whereby polymerization products come out of solution in the catalyst, reheating the cooled reaction mixture in a first stage to 50–55° C. and in a second stage to 70–100° C. in order to enhance coagulation of precipitated polymerization products, the said cooling and reheating being carried out in a single purification zone and the purified and reheated catalyst being returned to the synthesis zone, the purification treatment being carried out at sufficiently frequent intervals to keep the limit of saturation of the polymerization products in the hot catalyst from being exceeded.

9. A method of purifying and prolonging the period of activity of a cuprous salt catalyst in the synthesis of acrylonitrile from hydrocyanic acid and acetylene in a synthesis zone, which comprises removing only about one-tenth of the total quantity of the reaction mixture from the synthesis zone, at a temperature of 70–100° C. and before any separation has taken place in such reaction mixture, and cooling the thus-removed part to about 40° C., whereby polymerization products come out of solution in the catalyst, reheating the cooled reaction mixture in a first stage to 50–55° C. and in a second stage to 70–100° C. in order to enhance coagulation or precipitated polymerization products, the said cooling and reheating being carried out in successive zones of which the first is maintained at about 40° C. and the second at 50–55° C., and the purified and reheated catalyst being continuously returned from the latter to the synthesis zone, the purification treatment being carried out at sufficiently frequent intervals to keep the limit of saturation of the polymerization products in the hot catalyst from being exceeded.

References Cited in the file of this patent
UNITED STATES PATENTS

| | | |
|---|---|---|
| 1,916,825 | Burroughs | July 4, 1933 |
| 2,356,767 | Kropa | Aug. 29, 1944 |
| 2,632,737 | Stehman | Mar. 24, 1953 |